Nov. 19, 1935.   C. H. DUELL   2,021,444
CONTAINER
Filed July 8, 1932
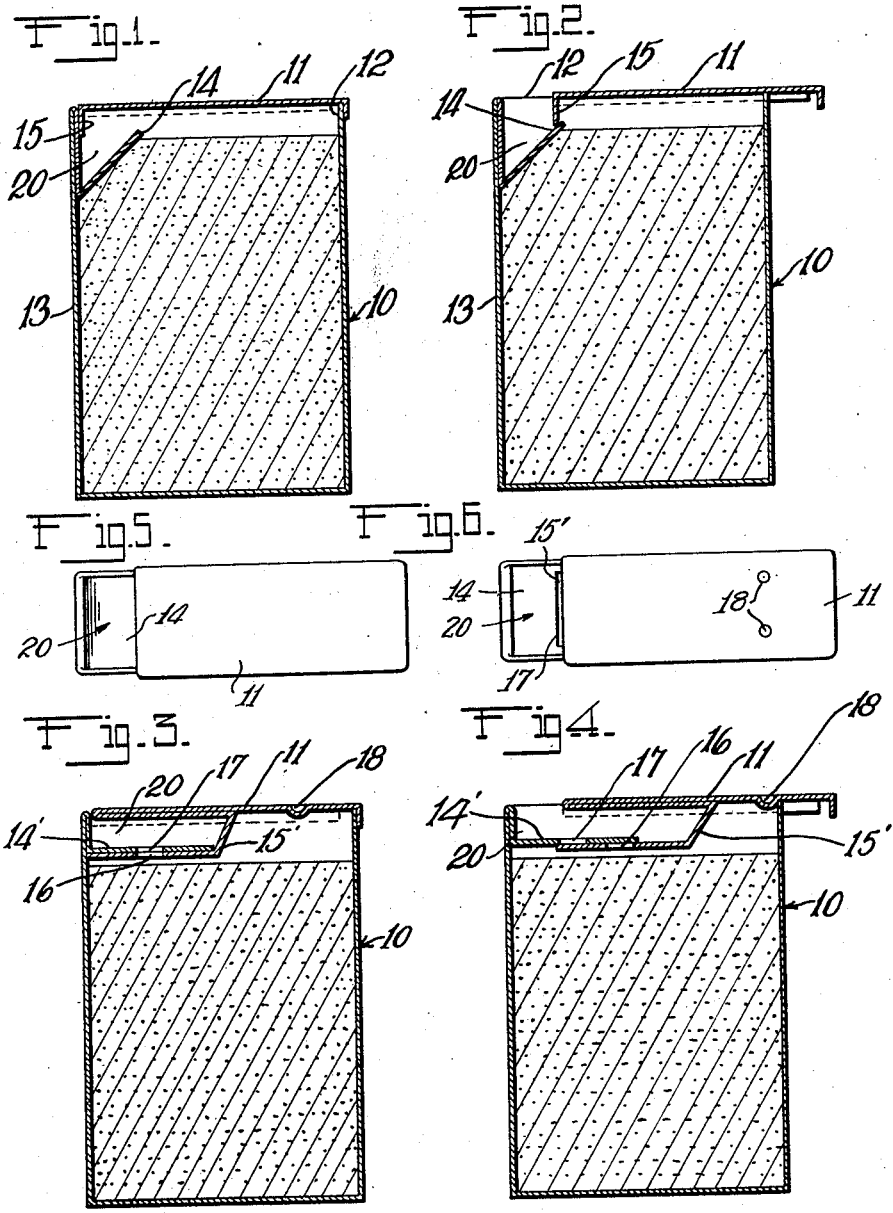
INVENTOR
Charles H. Duell
BY
Warfield & Brown
ATTORNEYS Patented Nov. 19, 1935

2,021,444

UNITED STATES PATENT OFFICE 2,021,444

CONTAINER

Charles H. Duell, New York, N. Y., assignor to International Cosmetic Company, Inc., New York, N. Y., a corporation of New York Application July 8, 1932, Serial No. 621,335

27 Claims. (Cl. 221—98)

This invention relates to containers and more specifically to dispensing containers.

In general, it is an object of the invention to provide a device of the character described, which will efficiently perform the purposes for which it is intended, which is simple and economical of construction, which can be expeditiously and conveniently manipulated and which can be readily manufactured and assembled.

Another object of the invention is to provide a device which will dispense a predetermined quantity of material at each operation.

Another object is to provide a device which, when the cover is slid back, will dispense a predetermined quantity of material and when closed and tilted will be ready to dispense another similar quantity.

Another object is to provide a device which will successively dispense similar quantities of the material contained, the only operation necessary being the tilting of the container and the opening of the cover.

Another object is to provide a container which, upon opening the cover, presents a predetermined quantity of material in a temporary, inner, auxiliary receptacle, the receptacle being refillable from the container after the cover is closed, without relative motion of the parts.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Fig. 1 is a cross section in elevation of a device embodying one form of the invention, the cover being closed;

Fig. 2 is a similar view of the device shown in Fig. 1, the cover being open;

Fig. 3 is a view similar to Fig. 1 of a modification of the device shown in Fig. 1;

Fig. 4 is a similar view of the device shown in Fig. 3, the cover being open;

Fig. 5 is a plan view of the device shown in Fig. 2; and

Fig. 6 is a plan view of the device shown in Fig. 4.

When material, in any form or condition which flows, is packaged, it is usually necessary to have some additional apparatus at hand to measure the quantity which is to be used at any given time. At times it is decidedly inconvenient to find even a teaspoon and there are occasions when it is as important that the correct amount be used as it is that any be used at all. The present invention is concerned with a container which measures out and dispenses the material in predetermined successive amounts. There are no movable parts other than the cover itself. There is no relative motion while the material is being measured. The opening of the cover opens a temporary receptacle to view and at the same time shuts it off from the remainder of the container. When the cover is closed, means attached thereto are in a position to permit passage of the material from the main container into the receptacle.

Numeral 10 in the drawing denotes a container provided with a cover 11 and side walls 13, the upper portions of which walls form, with said cover, the container or can top surmounting the body of the device. Any one of the side walls may be termed an "end wall", since the relative dimensions of the device are unimportant. The cover preferably slides over an opening 12 in said container top. It is shown on top, but it may be associated with any part of the container. An auxiliary inner container or receptacle 20 which occupies at least a portion of the opening 12 may be constructed in any convenient manner. For example, the material of one of the walls 13 may be folded so as to form an upwardly-extending member 14 extending into the container from side to side. Means associated with the cover form one portion of the inner receptacle. For example, a downwardly-extending flange 15 may, when the cover is in open position, contact with the member 14 and cut off all communication between the receptacle and the rest of the container.

Instead of removing a part of the receptacle wall by the motion of the cover a passageway between the receptacle and the container may be opened and shut simultaneously with the shutting and opening of the cover in any desired manner. In the modification shown in Figs. 3 and 4, the member or shelf 14' extends away from the wall 13 in the direction in which the cover slides. The flange 15' may in part lie along the member 14' and respective openings 16 and 17 therein may be in registry when the cover is open. The flange 15' may be constructed by folding back a portion of the cover. The motion of the cover may be limited by detents 18 therein which strike against the container wall when the cover has travelled a sufficient distance to uncover the inner receptacle and to insure that the openings 16 and 17 are not in registry.

The operation of the device is as follows: The container having been filled, the cover is closed and the entire device is tilted until the material therein runs past the flange 14 or through the openings 16 and 17 into the receptacle 20. The cover is then opened, shutting off communication between the receptacle and the main container but exposing the contents of the former. As the receptacle holds a known quantity, it is not necessary further to measure this but it may be dispensed directly.

The applications of this invention for medicine, cooking and in the home, the factory and commerce will be immediately evident.

Since certain changes may be in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent, is:

1. The combination comprising a container, a cover therefor and a member associated with said container and adapted to form with a part of said container a receptacle which does not communicate, when said cover is open, with the remainder of the chamber formed by said container, said member substantially cutting off communication between said receptacle and said remainder for certain positions of said container when said cover is shut.

2. In combination, a container, a shelf extending from a wall thereof, a movable cover for said container, a receptacle within said container and adapted, when said cover is in closed position, to contain material separate from any material in the remainder of said container, and an extension from said cover adjacent said shelf and forming therewith a wall of said inner receptacle.

3. In combination, a container, a shelf extending from a wall thereof, a movable cover for said container, a receptacle within said container and adapted, when said cover is in closed position, to contain material separate from any material in the remainder of said container, and an extension from said cover adjacent said shelf and forming therewith a wall of said inner receptacle, said shelf and said extension having openings registering when said cover is closed.

4. In combination, a container, a wall thereof folded on itself as a shelf therein, a movable cover for said container, a receptacle within said container and adapted, when said cover is in closed position, to contain material separate from any material in the remainder of said container, and an extension from said cover adjacent said shelf and forming therewith a wall of said inner receptacle.

5. In combination, a container, a movable cover, a receptacle within said container and adapted, when said cover is in closed position, to contain material separate from any material in the remainder of said container, and a shelf extending from a wall of said container, said cover for said container shaped to have an integral portion thereof lie adjacent said shelf and forming with said shelf a wall of said inner receptacle.

6. A container, the walls thereof forming an opening, a movable cover associated with said walls only at the periphery of said opening, a receptacle within said container and adapted, when said cover is in closed position, to contain material separate from any material in the remainder of said container, a shelf within said container, and an extension from said cover leading from said opening and forming one wall of said inner receptacle of which said shelf is another wall.

7. A container, the walls thereof forming an opening, a movable cover associated with said walls only at the periphery of said opening, a receptacle within said container and adapted, when said cover is in closed position, to contain material separate from any material in the remainder of said container, a shelf within said container, and an extension from said cover leading from said opening and forming one wall of said inner receptacle of which said shelf is another wall, and forming an added portion of said latter wall when said cover is open.

8. The combination comprising an outer container, an inner container communicating with said outer container and having walls fixed relatively to said outer container, and a slidable cover provided with means for setting off said inner container from said outer container when the cover is in open position, whereby said containers communicate only when said cover is partially or entirely closed.

9. The combination comprising an outer container, an inner container communicating with said outer container and having walls fixed relatively to said outer container, a movable cover element, and means associated with said element and adapted for setting off said inner container from said outer container when said cover is in open position.

10. The combination comprising an outer container, an inner container having walls fixed relatively to said outer container, and a movable cover for said outer container and provided with means for setting off said inner container from said outer container when in open position, whereby said containers communicate only when said cover is partially or entirely closed, said inner container being adapted for certain positions of said device for retaining material therein when said cover is open.

11. The combination comprising an outer container, an inner container having walls fixed relatively to said outer container, and a slidable element adapted, when in closed position, to cover said inner container and provided with means for setting off said inner container from said outer container, whereby said containers communicate only when said element is partially or entirely closed.

12. The combination comprising a container, a cover therefor and a member within and associated with said container and adapted to form, with a part of said container, a receptacle, parts of said cover and said member forming a passageway when said cover is closed and not forming a passageway when said cover is open, whereby said receptacle does not communicate, when said cover is open, with the remainder of the chamber formed by said container.

13. The combination comprising an outer container, an inner container communicating with said outer container, a cover for said outer container, a member projecting from said cover and so positioned that when said cover is moved to open position, said member is moved to cut off communication between the interior of the outer container and the inner container.

14. A dispensing can comprising a body portion, a can top surmounting said body portion, a measuring compartment within said can body having a bottom wall extending from one side wall to the other and inclining upwardly from a wall of said can into the body portion of the can, the upper edge of said inclined wall spaced from said can top, means providing an opening between said inclined wall and said can top forming an interior opening through which the contents of the can may be passed into said measuring compartment, and a cover for closing an opening in said can top, said cover having a depending member adjacent the forward end thereof which serves to close the interior opening when the cover is moved for uncovering said exterior opening in said can top.

15. A dispensing can comprising a body portion, a can top surmounting said body portion and having an opening therein, a sheet metal member shaped so as to form a measuring compartment supported wholly by said can body and including a rear wall folded over so as to form a portion of the end wall of the can body at the upper edge thereof, said rear wall being formed integral with an inclined bottom wall extending upwardly into the body portion of the can, the upper edge of said inclined wall being spaced from said can top, means forming an interior opening through which the contents of the can may be passed into said measuring compartment, and a cover for closing said opening in the can top, said cover having a depending member adjacent the forward end thereof which serves to close the interior opening when the cover is moved for uncovering said exterior opening in said can top.

16. The combination comprising a container, a cover therefor, a member within and associated with said container and adapted to form, with a part of said container, a receptacle communicating with the remainder of the chamber formed by said container, and barrier means operated by said cover and adapted, when said cover is in open position, to co-operate with said member to close the communication between said receptacle and the remainder of the chamber formed by said container.

17. The combination comprising a container, a slidable cover therefor, a member within and associated with said container and adapted to form, with a part of said container, a fixed receptacle communicating with the remainder of the chamber formed by said container, and barrier means operated by said cover and adapted, when said cover is in open position, to co-operate with said member to close the communication between said receptacle and the remainder of the chamber formed by said container.

18. The combination comprising a container, a cover therefor, a member extending from a wall of said container and adapted to form, with a part of said container, a receptacle communicating with the remainder of the chamber formed by said container, and barrier means operated by said cover and adapted, when said cover is in open position, to co-operate with said member to close the communication between said receptacle and the remainder of the chamber formed by said container.

19. The combination comprising a container providing a chamber, a cover therefor, one wall of said container being shaped to form a receptacle communicating with the chamber formed by the remainder of said container when said cover is partially or entirely closed, and barrier means operated by said cover and adapted to co-operate with the wall forming the said receptacle to prevent communication between said receptacle and the chamber formed by the rest of the container when said cover is in open position.

20. The combination comprising a container, a cover therefor, a member within and associated with said container and adapted to form with a part of said container, a receptacle, said member projecting upwardly and inwardly from a position on the side wall of the container a substantial distance below the top of said side wall and terminating at a relatively short distance beneath said container cover, whereby a passageway is formed between said container and said receptacle, and means operated by said cover and adapted for blocking said passageway when said cover is open, whereby said receptacle does not communicate, when said cover is open, with the remainder of the chamber formed by said container.

21. The combination comprising a container, a slidable cover therefor, a member associated with said container and adapted to form with a part of said container a fixed receptacle, said member projecting upwardly and inwardly from a position on the side wall of the container a substantial distance below the top of said side wall and terminating at a relatively short distance beneath said container cover, whereby a passageway is formed between said container and said receptacle, and means operated by said cover and adapted for blocking said passageway when said cover is open, whereby said receptacle does not communicate with the remainder of the chamber formed by said container when said cover is open.

22. The combination comprising a container, a cover therefor, a member extending from a wall of said container and adapted to form with a part of said container a receptacle, said member projecting upwardly and inwardly from a position on the side wall of the container a substantial distance below the top of said side wall and terminating at a relatively short distance beneath said container cover, whereby a passageway is formed between said container and said receptacle, and means operated by said cover and adapted for blocking said passageway when said cover is open, whereby said receptacle does not communicate with the remainder of the chamber formed by said container when said cover is open.

23. The combination comprising a container providing a chamber, a cover therefor, one wall of said container being shaped to form a receptacle, a member projecting upwardly and inwardly from a position on the side wall of the container a substantial distance below the top of said side wall and terminating at a relatively short distance beneath said container cover, whereby a passageway is formed between said container and said receptacle, and means operated by said cover and adapted for blocking said passageway when said cover is open, whereby said receptacle communicates with said chamber only when said cover is partially or entirely closed.

24. The combination comprising a container, a cover therefor, a member within and associated with said container and adapted to form with a part of said container, a receptacle, means providing a passageway between said container and said receptacle, and means operated by said cover and adapted for blocking said passageway when said cover is open, whereby said receptacle does not communicate, when said cover is open, with the remainder of the chamber formed by said container, said remainder extending in part about said receptacle on the side thereof opposite said cover.

25. The combination comprising a container, a slidable cover therefor, a member associated with said container and adapted to form with a part of said container a fixed receptacle, means providing a passageway between said container and said receptacle, and means operated by said cover and adapted for blocking said passageway when said cover is open, whereby said receptacle does not communicate with the remainder of the chamber formed by said container when said cover is open, said remainder extending in part about said receptacle on the side thereof opposite said cover.

26. The combination comprising a container, a cover therefor, a member extending from a wall of said container and adapted to form with a part of said container a receptacle, means providing a passageway between said container and said receptacle, and means operated by said cover and adapted for blocking said passageway when said cover is open, whereby said receptacle does not communicate with the remainder of the chamber formed by said container when said cover is open, said remainder extending in part about said receptacle on the side thereof opposite said cover.

27. The combination comprising a container providing a chamber, a cover therefor, one wall of said container being shaped to form a receptacle, means providing a passageway between said container and said receptacle, and means operated by said cover and adapted for blocking said passageway when said cover is open, whereby said receptacle communicates with said chamber only when said cover is partially or entirely closed, said chamber extending in part about said receptacle on the side thereof opposite said cover.

CHARLES H. DUELL.